(12) United States Patent
Schuelein et al.

(10) Patent No.: US 7,770,164 B2
(45) Date of Patent: Aug. 3, 2010

(54) SOFTWARE UPGRADES WITH CENTRALIZED PREPARATION

(75) Inventors: Horst Schuelein, Poxdorf (DE); Klaus Gartner, Schnaittach (DE); Gerhard Strobl, Amberg (DE)

(73) Assignee: Siemens Aktiengesellschaft (DE)

( * ) Notice: Subject to any disclaimer, the term of this patent is extended or adjusted under 35 U.S.C. 154(b) by 1464 days.

(21) Appl. No.: 11/141,618

(22) Filed: May 31, 2005

(65) Prior Publication Data

US 2006/0271925 A1    Nov. 30, 2006

(51) Int. Cl.
G06F 9/44 (2006.01)
A61B 5/05 (2006.01)
(52) U.S. Cl. ...................................... 717/168; 600/410
(58) Field of Classification Search .................. 717/168
See application file for complete search history.

(56) References Cited

U.S. PATENT DOCUMENTS

| 5,297,551 | A  | * | 3/1994  | Margosian et al. | 600/410 |
| 5,603,323 | A  | * | 2/1997  | Pflugrath et al. | 600/437 |
| 6,189,146 | B1 | * | 2/2001  | Misra et al. | 717/177 |
| 6,272,469 | B1 | * | 8/2001  | Koritzinsky et al. | 705/2 |
| 6,324,578 | B1 | * | 11/2001 | Cox et al. | 709/223 |
| 6,823,508 | B1 | * | 11/2004 | Burkhardt et al. | 717/174 |
| 7,043,715 | B1 | * | 5/2006  | Bauer et al. | 717/107 |
| 2005/0132348 | A1 | * | 6/2005 | Meulemans et al. | 717/168 |
| 2005/0203975 | A1 | * | 9/2005 | Jindal et al. | 707/204 |
| 2006/0080653 | A1 | * | 4/2006 | Siwatu et al. | 717/173 |
| 2006/0123414 | A1 | * | 6/2006 | Fors et al. | 717/177 |

* cited by examiner

Primary Examiner—Lewis A Bullock, Jr.
Assistant Examiner—Paul Mills
(74) Attorney, Agent, or Firm—Brinks Hofer Gilson & Lione

(57) ABSTRACT

Interactive software applications are upgraded at a remote service center. The software applications are used at customer locations. Each software application may rely upon customer specific data and customer protocols. Periodically, a revised version of a software application becomes available for use. The customer specific data and/or customer protocols that the previous version of the software application implemented at a customer location may be identified at the remote service center. Subsequently, the revised version of the software application may be modified at the remote service center using the customer specific data and/or customer protocols. The modified revised software application may be transferred to the customer location for installation. The customer specific data may pertain to user interface settings of the software application. The customer protocols may pertain to the type of machines on which the software application operates or specific imaging or other modules of the software application.

15 Claims, 5 Drawing Sheets

SOFTWARE UPGRADES WITH CENTRALIZED PREPARATION

FIELD

The present invention relates generally to systems for interactive software applications that assist a user. More particularly, the present invention relates to updating interactive software applications located at various customer facilities with revised versions from a remote service center.

BACKGROUND

Interactive software applications are installed and used by customer personnel at various customer locations. For example, the interactive software applications may be directed to medical applications. The software applications may assist medical personnel located at hospitals and other medical facilities to diagnose and treat patients. More specifically, the software applications may support medical imaging techniques and devices. The software applications also may facilitate maintaining and updating medical files associated with individual patients. The software applications may be directed toward other types of applications as well, both medical and non-medical.

Periodically, the software applications in use are revised and updated. However, the installation of the software upgrades may be cumbersome and time intensive. For instance, an experienced software technician is typically required to install the software upgrades on computers located at each customer facility. Once at the customer facility, the technician has to initially back-up all the user specific data and customized application settings. After saving the customized application settings, the technician installs the new version of the software application. Subsequently, the technician re-installs the saved customized settings.

Additionally, after the new version of the application is installed, so-called client or customer protocols, such as hardware and configuration specific protocols, may have to be converted to become compatible with the new version of software. During the entire software upgrade process, the customer's computer or machine is unavailable for use by customer personnel.

BRIEF SUMMARY

A system and method at least partially upgrade software applications at a remote service center. Interactive software applications used by customer personnel at various customer facilities may rely upon customer specific data and customer protocols. A revised or updated version of an interactive software application may become available for use. The customer specific data and/or customer protocols that the previous version of the software application implemented at each customer facility may be identified at the remote service center. Subsequently, the revised version of the software application may be modified at the remote service center using the customer specific data and/or customer protocols. The modified revised version of the software application implementing the customer specific data and/or customer protocols may then be transferred to the customer facility for installation.

In one embodiment, a method upgrades software at a remote service center. The method includes receiving customer specific data related to a previous version of a software application from a customer location at a remote service center and modifying a revised version of the software application at the remote service center using the customer specific data. The method may further include transferring the modified revised version of the software application to the customer location.

In another embodiment, a method upgrades software at a remote service center. The method includes receiving customer protocol data identifying customer protocols related to a previous version of a software application from a customer location at a remote service center and modifying the customer protocol data to become compatible with a revised version of the software application at the remote service center. The method may further include transferring the modified customer protocol data to the customer location.

In another embodiment, a data processing system upgrades software at a remote service center. The system includes a memory unit located at a remote service center operable to store a revised version of a software application. The system also includes a processing unit located at the remote service center operable to receive customer specific data related to a previous version of the software application from a customer location and store the customer specific data in the memory unit. The processing unit modifies the revised version of the software application using the customer specific data. Subsequently, the system may transfer the modified revised version of the software application to the customer location.

In yet another embodiment, a computer-readable medium provides instructions executable on a computer. The instructions direct receiving customer specific data from a customer location related to a customized user interface of a previous version of a software application, modifying a revised version of the software application using the customer specific data, and transferring the modified revised version of the software application to the customer location. The revised version of the software application is modified to employ a user interface substantially identical to the customized user interface of the previous version of the software application.

Advantages will become more apparent to those skilled in the art from the following description of the preferred embodiments which have been shown and described by way of illustration. As will be realized, the system and method are capable of other and different embodiments, and their details are capable of modification in various respects. Accordingly, the drawings and description are to be regarded as illustrative in nature and not as restrictive.

DETAILED DESCRIPTION

Figure 1:
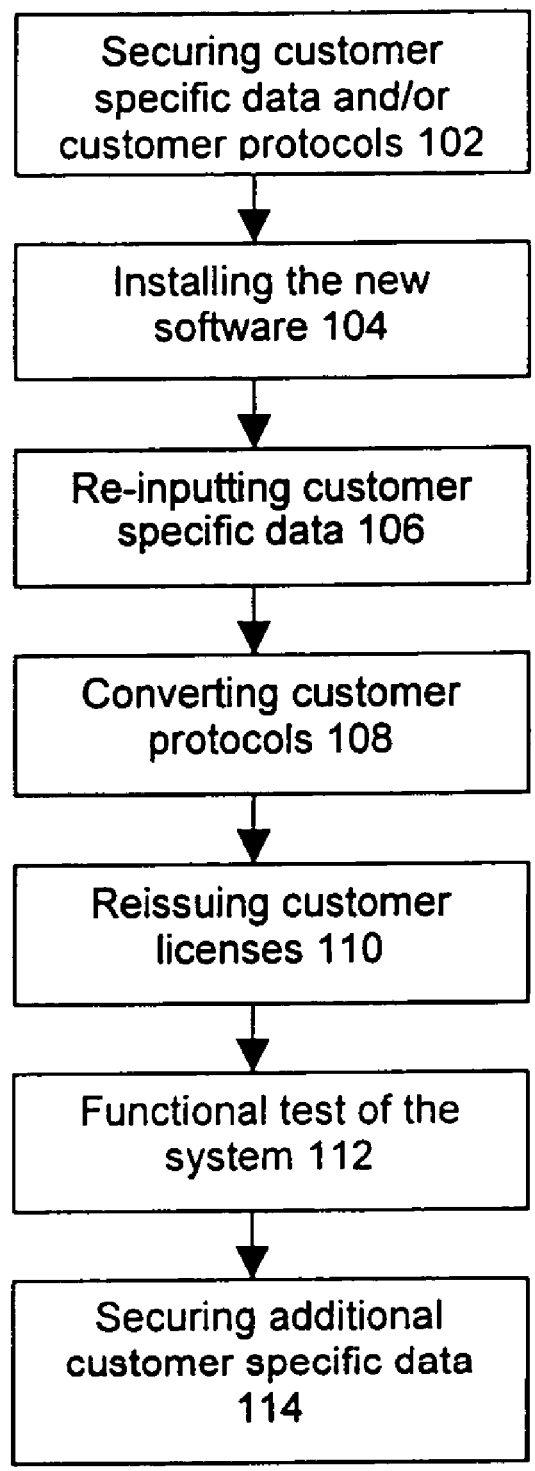
FIG. 1 illustrates a conventional method of upgrading a software application at a customer location.

A system and method at least partially upgrade software applications at a remote service center. Interactive software applications are used at various customer locations. The software applications may rely upon customer specific data and/or customer protocols. A revised or updated version of an interactive software application may become available for use. The customer specific data and/or customer protocols that the previous version of the software application implemented at each customer location may be identified at the remote service center. The revised version of the software application may be modified at the remote service center using the customer specific data and/or customer protocols.

Subsequently, the modified revised version of the software application may be transferred to the customer location for installation and an associated customer software license may be reissued. After the installation of the modified revised version of the software application, a functional test of the software application may be performed.

In general, the software applications may employ the capabilities of a computer directly to a task that the user wishes to be performed. The software applications may provide one or more particular functions, such as a word processor or a database function. In one embodiment, the software applications are directed to the field of medicine and assist medical personnel with the diagnosis of medical conditions and the treatment of patients. However, alternate software applications may be revised and modified at a remote service center.

The customer specific data may include all of the individual customer data and settings used by the software application. The customer specific data may be needed to restore the complete software application. The customer specific data may enable the restoration of a customized user interface, i.e., the overall look and feel of the previous version of the software application as used at a customer location.

In particular, the customer specific data may be used to restore a graphic user interface of the software application, parameter settings, individual menu settings, the functionality of one or more particular macros, modules, or subroutines, or other portions of the software application. The customer specific data also may be used to restore user specific functions and their corresponding properties associated with the software application. The customer specific data may relate to additional, fewer, or alternate types of individual customer customized data, settings, and functionality.

The customer protocols may account for hardware and hardware configurations, as well as the software configurations. The customer protocols may include all settings and parameters related to the type of computers and/or machines that the software application operates on at the customer location. For example, the customer protocols may be manufacturer, supplier, or distributor specific and depend upon the manufacturer of the computer and/or machine. The customer protocols also may depend upon the use or application to which the computer and/or machine is put. The customer protocols may account for specific modules, macros, and subroutines of the software application. Additional, fewer, or alternate customer protocols also may be used.

The customer locations may be dispersed facilities located some distance away from a remote service center. The service center may be a location from which software technicians and field engineers modify revised versions of pre-existing software applications. The customer specific data and/or customer protocols related to a previous version of a software application may be transferred to the service center. The transfer of the customer specific data and/or customer protocols to the remote service center may eliminate the need for the field engineers to travel to the customer locations to retrieve the customer specific data and/or customer protocols.

The transfer of the customer specific data and/or customer protocols to the remote service center also may eliminate the need for the field engineers to locate, identify, and save the customer specific data and/or customer protocols in the field (i.e., at the customer's location). The back up of the customer specific data and/or identification of customer protocols in the field requires the field engineer to occupy the customer's machine, which interferes with and degrades the effective use of the machine by customer personnel. Hence, the elimination of backing up customer specific data and/or identification of customer protocols in the field by field engineers may reduce the amount of time that a machine is unavailable for use by customer personnel.

The revised version of the software application may be modified at the remote service center using the customer specific data and/or customer protocols. The modification of the revised version of the software application at the remote service center also may eliminate the need for the field engineer, at the customer location, to (1) install a clean revised version of the software application on a customer computer or machine, (2) re-input all of the customer specific data after installation of the revised version of the software application, and (3) convert the customer protocols to become compatible with the revised version of the software application. The reduction in the amount of work that the field engineer performs at the customer location (occupying the customer's machine) also may reduce the amount of time that the customer's machine is unavailable for use by customer personnel.

At the remote service center, the upgraded version of the software application that includes restored user settings and converted customer protocols may be installed on a machine comparable or equal to the customer's machine. After which, a customized executable version of the upgraded software application may be generated. The executable version may be uploaded to the customer's machine via remote connection or portable storage medium and replace the older version of the software application.

FIG. 1 illustrates a conventional method of upgrading a software application at a customer location. Previously, software applications would be upgraded in the field. A software technician or field engineer would travel to a customer location where the software application is installed on one or more local computers and machines. At the customer location, the field engineer backs up all of the individual customer data and settings utilized by the software application. The back up data is used to restore the complete software application.

As shown in FIG. 1, at the customer location, the software technician typically initially saves customer specific data and/or customer protocol data 102. The software technician installs a new or revised version of the software application 104 and re-inputs the customer specific data 106. The software technician also converts the customer protocols 108 to become compatible with the revised version of the software application.

In many cases, because of the detailed nature of software application licenses, a new customer software license is issued 110. The new software licenses are typically requested from a central licensing office. After which, a functional test of the system 112 may be performed. Additionally, customer specific data 114 may be obtained specific to the revised version of the software application. During the entire conventional upgrade process, the customer's machine may be occupied by a field engineer, which prevents or limits the effective use of the machine by customer personnel.

Performing some, most, or all of the steps involved with upgrading software applications at a remote service center reduces the amount of work performed by field engineers at the customer location. By reducing the amount of work involved with upgrading software applications performed at the customer location, the amount of time that customer personnel may not effectively use each machine or computer is reduced.

Additionally, by increasing the amount of work performed by software technicians and engineers at a single, remote service center may increase their effectiveness and efficiency. In some instances, the travel times to the customer locations expended by the field engineers may be reduced as the software upgrade may be accomplished within fewer hours. For example, software upgrades that require more than one work day to complete may require the field engineer to make two or more trips to the customer location.

Increasing the amount of work performed by the engineers at a single location also may reduce errors in the upgrade process as the internal upgrade process at the single location may be substantially replicable. Additionally, upgrading software from a single location may reduce the number of knowledgeable technicians typically required to be in the field.

Figure 2:
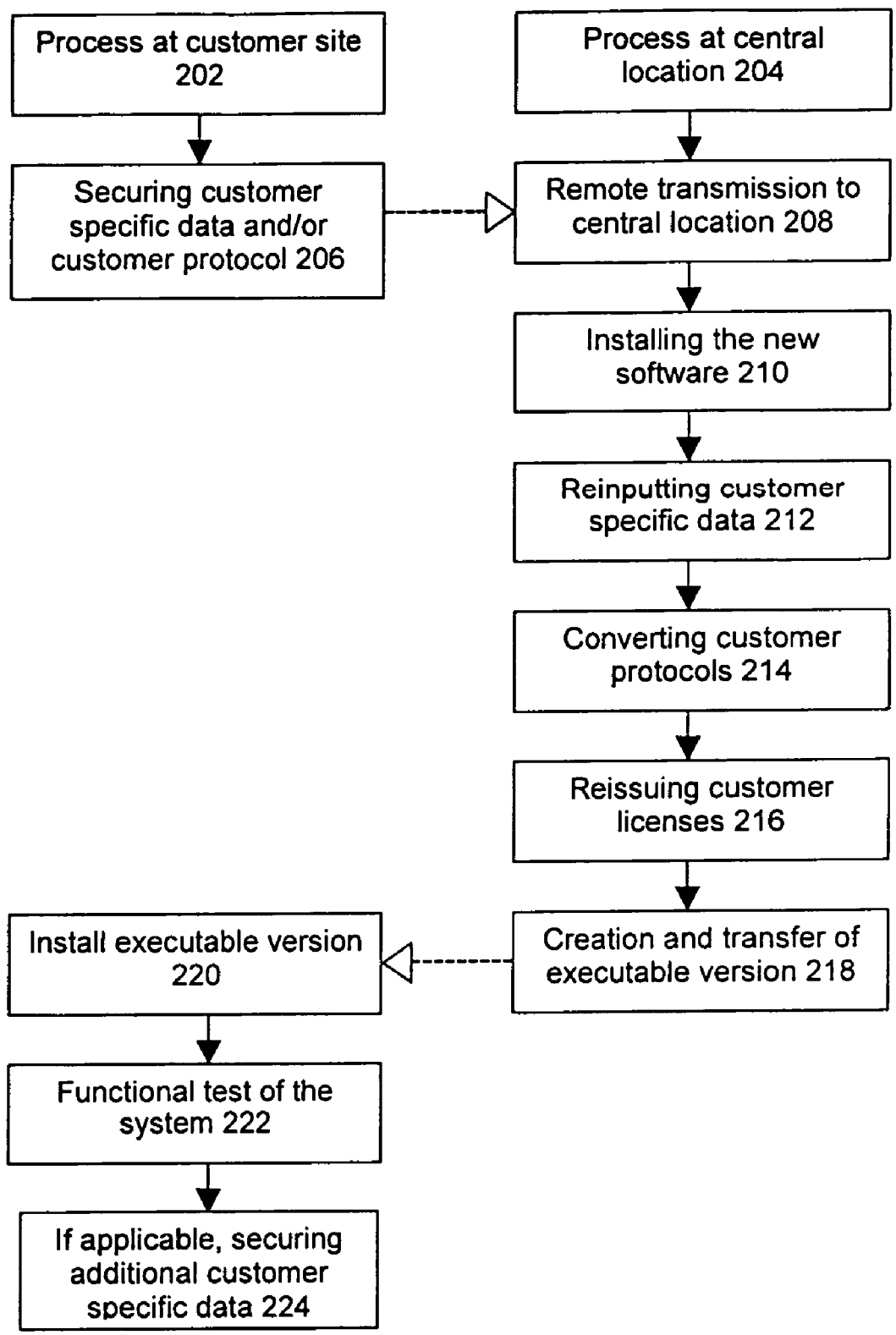
FIG. 2 is an exemplary technique for upgrading a software application at a remote service center.

FIG. 2 is an exemplary technique for upgrading a software application at a remote service center. The left hand side of FIG. 2 illustrates steps performed at a customer site 202 and the right hand side illustrates steps performed at a central location 204, such as a remote service center. At the customer site, the customer specific data and/or customer protocol data for a software application may be identified and saved 206. The customer specific data and/or customer protocol data identified and saved may include the type of information detailed previously. For instance, the data identified and saved may relate to the type of hardware, the hardware configuration, the software configuration, measurement protocols generated by the customer, and network information. Additional, fewer, or alternate types of data also may be identified and saved at the customer location.

The customer specific data and/or customer protocol data may be transferred to the central location 208. The customer specific data and/or customer protocol data may be transmitted to the central location via remote connection, such as the Internet or other network, given enough available bandwidth. The customer specific data and/or customer protocol data also may be transferred to the central location via portable storage medium, such as digital versatile disc, compact disc, or other electronic storage units. Alternate methods of transferring the customer specific data and/or customer protocol data to the central location may be used.

At the central location, the new or revised version of the software application may be installed on a machine that is comparable or equal to the customer's machine. Other machines may be used. The revised version of the software application may be a complete new version of the software application, a partial new version of the software application, an add-on or update of the previous version of the software application, or other software that provides new functionality for the software application.

A software technician or engineer may integrate the customer specific data with the revised version of the software application by re-inputting the customer specific data 212. Additionally, the software engineer may modify the revised version of the software application to become compatible with the customer protocols 214.

Alternatively, a data processing system located at the central location may automatically integrate the customer specific data with the revised version of the software application. The data processing system may customize the revised version of the software application by fully or partially automatically re-inputting the customer specific data 212. Additionally, the data processing system may fully or partially automatically modify the revised version of the software application to become compatible with the customer protocols 214.

A customer software license may be reissued 216 at the central location. The customer software license may be automatically generated by the data processing system located at the central location. However, the software license may be reissued at any point in the process, including at the customer site.

An executable version of the revised version of the software application may be generated 218 at the central location using the customer specific data and/or customer protocols. Hence, the executable version may be a modified and customized version of the revised software application.

Subsequently, the executable or modified revised version of the software application may be transferred to the customer site. The modified revised version of the software application may be transmitted to the customer site via remote connection, such as the Internet or other network, available bandwidth permitting. The software application also may be transferred to the customer site via portable storage medium, such as digital versatile disc, compact disc, or other electronic storage unit. Alternate methods of transferring the modified revised version of the software application to the customer site may be used.

At the customer site, the modified revised version of the software application may be installed on a customer machine 220. A functional test of the customer's system 222 may then be performed. With some upgraded software applications, additional customer specific data may be identified 224. For example, the revised version of the software application may include additional features and functions that may be modified or customized by the user. The technique for upgrading a software application at a remote service center may include additional, fewer, or alternative steps.

Figure 3:
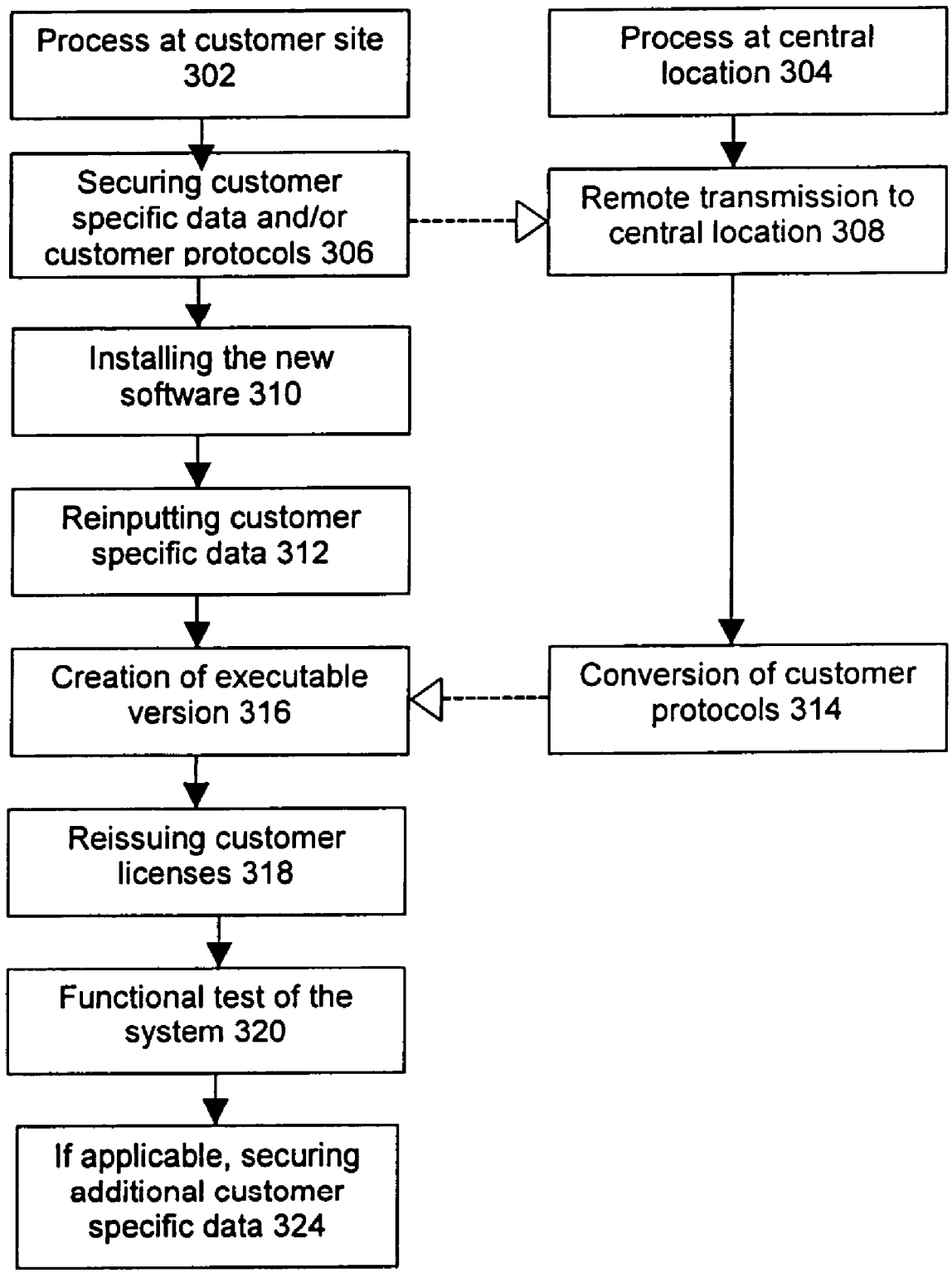
FIG. 3 is another exemplary technique for upgrading a software application at a remote service center.

For example, FIG. 3 is another exemplary technique for upgrading a software application at a remote service center. The left hand side of FIG. 3 illustrates steps performed at a customer site 302 and the right hand side illustrates steps performed at a central location 304, such as a remote service center. At the customer site, the customer specific data and/or customer protocol data for a software application may be identified and saved 306.

The customer protocol data may be transferred to the central location 308. The customer protocol data may be transmitted to the central location via remote connection, such as the Internet or other network. The customer protocol data also may be transferred to the central location via portable storage medium, such as digital versatile disc, compact disc, or other electronic storage units. Alternate methods of transferring the customer protocol data to the central location may be used.

At the customer site, a field engineer may install the new or revised version of the software application on a customer machine 310. The field engineer may integrate the customer specific data with the revised version of the software application by re-inputting the customer specific data 312 after installation of the revised version.

At the central location, a software technician may convert the customer protocols 314 to become compatible with the revised version of the software application. Alternatively, a data processing system located at the central location may fully or partially automatically convert the customer protocols 314 to become compatible with the revised version of the software application.

The converted customer protocol data may be transferred to the customer site. The converted customer protocol data may be transmitted to the customer site via remote connection, such as the Internet or other network. The converted customer protocol data also may be transferred to the customer site via portable storage medium, such as digital versatile disc, compact disc, or other electronic storage unit. Alternate methods of transferring the converted customer protocol data to the customer site may be used.

Subsequently, an executable version of the revised version of the software application may be generated 316 at the customer site using the customer specific data and converted customer protocols. Thus, the resulting executable version may be a modified and customized version of the revised software application.

A customer software license may be reissued 318. However, the software license may be reissued before or after the executable version of the revised version of the software application is generated. The software license also may be reissued at either the central location or at the customer site.

At the customer site, after the generation of the executable version of the revised version of the software application, a functional test of the customer's system 320 may be performed. With some upgraded software applications that include additional features or functions, additional customer specific data may be identified 324. The technique for upgrading a software application at a remote service center may include additional, fewer, or alternative steps.

Figure 4:
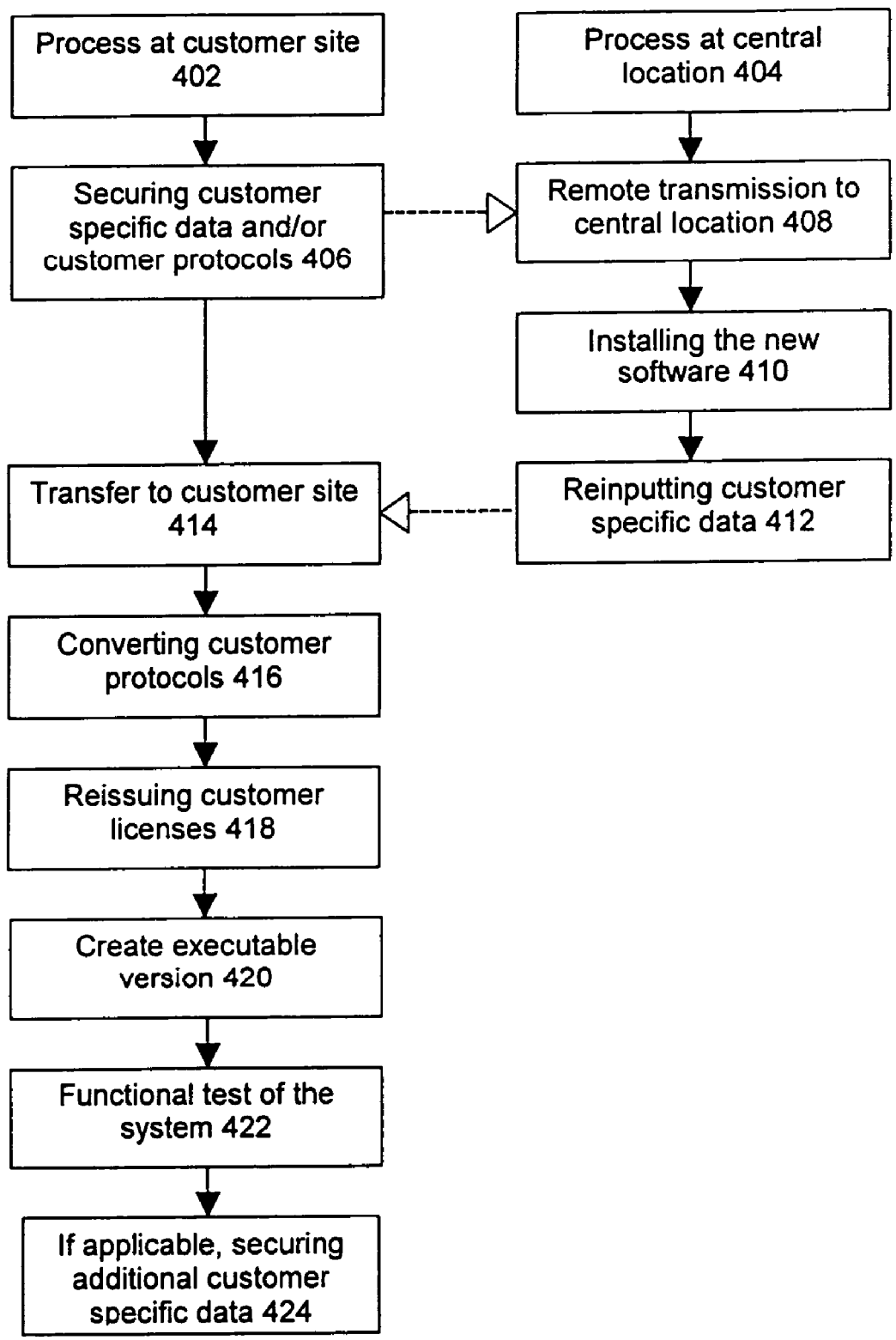
FIG. 4 is another exemplary technique for upgrading a software application at a remote service center.

FIG. 4 is another exemplary technique for upgrading a software application at a remote service center. The left hand side of FIG. 4 illustrates steps performed at a customer site 402 and the right hand side illustrates steps performed at a central location 404, such as a remote service center. At the customer site, the customer specific data and/or customer protocol data for a software application may be identified and saved 406.

The customer specific data may be transferred to the central location 408. The customer specific data may be transmitted to the central location via remote connection, such as the Internet or other network. The customer specific data also may be transferred to the central location via portable storage medium, such as digital versatile disc, compact disc, or other electronic storage units. Alternate methods of transferring the customer specific data to the central location may be used.

At the central location, the new or revised version of the software application may be installed 410 on a machine. The machine may be comparable to or the same as the customer's machine. Alternate machines may be used.

A software technician or engineer may integrate the customer specific data with the revised version of the software application by re-inputting the customer specific data 412. Alternatively, a data processing system located at the central location may automatically integrate the customer specific data with the revised version of the software application. The data processing system may customize the revised version of the software application by fully or partially automatically re-inputting the customer specific data 412.

The modified revised version of the software application, specifically adapted for use by the customer specific data, may be transferred to the customer site 414. The modified revised version of the software application may be transmitted to the customer site via remote connection, such as the Internet or other network. The software application also may be transferred to the customer site via portable storage medium, such as digital versatile disc, compact disc, or other electronic storage unit. Alternate methods of transferring the modified revised version of the software application to the customer site may be used.

At the customer site, a software technician may convert the customer protocols 416 to become compatible with the modified revised version of the software application. A customer software license may be reissued 418 at either the central location or at the customer site. Moreover, the software license, if necessary, may be reissued at any point in the process.

An executable version of the modified revised version of the software application may be generated 420 at the customer site using the converted customer protocols. Hence, the executable version may be a modified and customized version of the revised software application.

A functional test of the customer's system 422 may be performed. With some upgraded software applications that include additional features and functions, additional customer specific data may be identified 424. The technique for upgrading a software application at a remote service center may include additional, fewer, or alternative steps.

Figure 5:
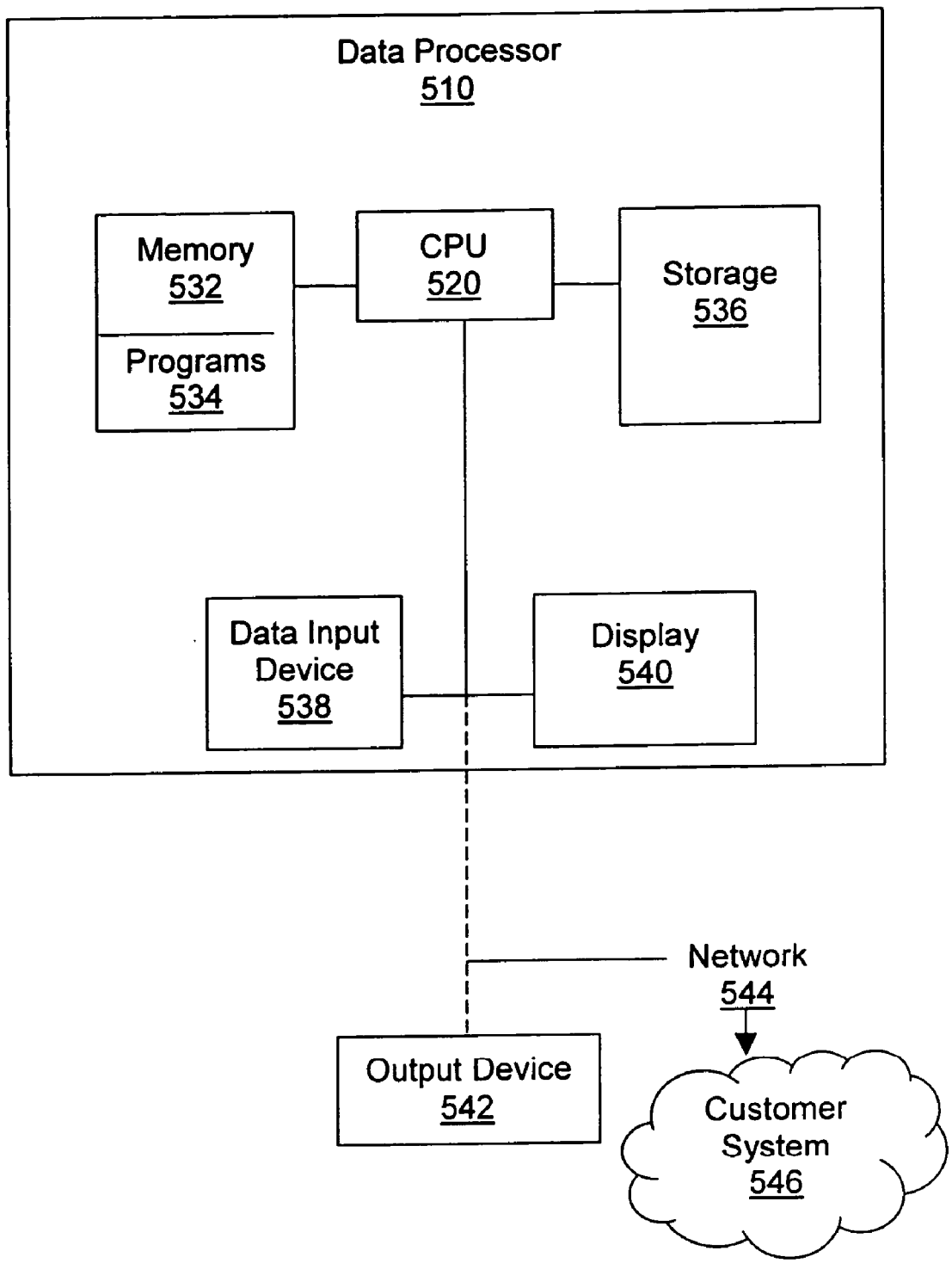
FIG. 5 illustrates an exemplary data processor configured or adapted to provide the functionality for upgrading a software application at a remote service center.

FIG. 5 illustrates an exemplary data processor 110 configured or adapted to provide the functionality for upgrading software applications at a remote service center. The data processor 510 may be located at a remote service center. The data processor may include a central processing unit (CPU) 520, a memory 532, a storage device 536, a data input device 538, and a display 540. The processor 510 also may have an external output device 542, which may be a display, a monitor, a printer or a communications port. The processor 510 may be a personal computer, work station, PACS station, or other medical imaging system. The processor 510 may be interconnected to a network 544, such as an intranet, the Internet, or an intranet connected to the Internet. The processor 510 may be interconnected to a customer system 546 or location via the network 544. The data processor 510 is provided for descriptive purposes and is not intended to limit the scope of the present system. The processor may have additional, fewer, or alternate components.

A program 534 may reside on the memory 532 and include one or more sequences of executable code or coded instructions that are executed by the CPU 520. The program 534 may be loaded into the memory 532 from the storage device 536. The CPU 520 may execute one or more sequences of instructions of the program 534 to process data. Data may be input to the data processor 510 with the data input device 538 and/or received from the network 544 or customer system 546. The program 534 may interface the data input device 538 and/or the network 544 or customer system 546 for the input of data. Data processed by the data processor 510 may be provided as an output to the display 540, the external output device 542, the network 544, the customer system 546, and/or stored in a database. The program 534 and other data may be stored on or read from machine-readable medium, including secondary storage devices such as hard disks, floppy disks, CD-ROMS, and DVDs; electromagnetic signals; or other forms of machine readable medium, either currently known or later developed.

In one embodiment, the data processor 510 may comprise a machine comparable or equal to a customer machine on which an old or previous version of a software application operates. Alternate data processors may be used.

A revised version of the software application may be received by the data processor 510 from the data input device 538, the network 544, or another input device. After which, the revised version of the software application may be stored in the memory 532, the storage device 536, or other storage unit.

Customer specific data and/or customer protocol data related to the previous version of a software application may be received from a customer location by the data processor 510 via the data input device 538, the network 544, the customer system 546, or another input device. The data processor 510 may modify the revised version of the software application using the customer specific data and/or the customer protocol data.

The data processor 510 may integrate the customer specific data with the revised version of the software application to modify the revised version of the software application. The integration of the customer specific data with the revised version of the software application by the data processor 510 may be fully or partially automated. The modified revised version of the software application may substantially replicate or restore the user interface and other user specific settings of the previous version of the software application on the display 540, output device 542, a customer machine located at the customer site, or other display device.

The data processor 510 may convert the customer protocol data to become compatible with the revised version of the software application. The data processor 510 may then generate an executable version of the revised version of the software application that takes into account the customer specific data and/or the customer protocols. The conversion of the customer protocol data to become compatible with the revised version of the software application, as well as the generation of an executable version, by the data processor 510 may be fully or partially automated.

The data processor 510 may generate a customer software license tailored toward the modified revised version of the software application. The software license may be transferred to the customer via the network 554, the output device 542, or other manner.

The executable version of the modified revised version of the software application may then be transferred to the customer location via the network 554, the output device 542, or other manner. The executable version transferred to the customer location may then be installed and tested at the customer site. Data processors performing additional, fewer, or alternate functions also may be used at the remote service center.

For instance, in one embodiment, the data processor 510 may only receive customer specific data from the customer location via the data input device 538, the network 544, the customer system 546, or other input device. The data processor 510 may modify the revised version of the software application using the customer specific data. The data processor 510 may transfer the modified revised version of the software application to the customer location via the network 544, the output device 542, or other method. At the customer location, the modified revised version of the software application may be further altered to account for customer protocols.

In another embodiment, the data processor 510 may only receive customer protocol data from the customer location via the data input device 538, the network 544, the customer system 546, or other input device. The data processor 510 may convert the customer protocol data to become compatible with the revised version of the software application. The data processor 510 may transfer the converted customer protocol data to the customer location via the network 544, the output device 542, or other method. At the customer location, the revised version of the software application may be altered to account for the converted customer protocol data, as well as the customer specific data.

Alternatively, the data processor 510 may modify the revised version of the software application using the customer protocol data. The data processor 510 may then transfer the revised version of the software application modified based upon the customer protocols to the customer location via the network 544, the output device 542, or other method. At the customer location, the modified revised version of the software application may be altered to account for the customer specific data.

Exemplary Embodiment for Medical Software Applications

In one embodiment, the software applications are directed toward the medical field. The customer locations may be hospitals, clinics, or other medical facilities. The customer personnel may include doctors, nurses, and other medical personnel. The software applications may assist the medical personnel with the diagnosis of medical conditions and the treatment of patients.

The software applications may relate to processing images illustrating an enhanced region of interest within a patient. For example, various types of contrast medium may be administered to a medical patient. The contrast mediums enhance the scans acquired by scanning a patient or images of the patient, the scans and images may be recorded by an external recording device as enhancement data. The contrast medium typically travels through a portion of the body, such as in the blood stream, and reaches an area that medical personnel are interested in analyzing. While the contrast medium is traveling through or collected within a region of interest, a series of scans or images of the region of interest of the patient may be recorded for processing and display by the software applications. The enhanced region of interest may show the brain, the abdomen, the heart, the liver, a lung, a breast, the head, a limb or any other body area.

The expected enhancement data may be generated for one or more specific type of image processes that are used to produce the images or scans of the patient. In general, the types of imaging processes that may be used to produce patient images or scans of internal regions of interest include radiography, angioplasty, computerized tomography, ultrasound and magnetic resonance imaging (MRI). Additional types of imaging processes that may be used include perfusion and diffusion weighted MRI, cardiac computed tomography, computerized axial tomographic scan, electron-beam computed tomography, radionuclide imaging, radionuclide angiography, single photon emission computed tomography (SPECT), cardiac positron emission tomography (PET), digital cardiac angiography (DSA), and digital subtraction angiography (DSA). Alternate imaging processes may be used.

Each software application may have customer protocols dependent upon the type of imaging process(es) or imaging processing device that the software application supports. The customer protocols may comprise all of the settings for the operating machines and medical imaging modules and subroutines associated with the software application in order to generate medical image data. The settings may be manufacturer, supplier, or distributor specific or may be customized by the customer. For example, the customer protocols may account for the type of machine used by the customer and/or comprise settings for magnetic resonance imaging devices, computer tomography devices, and other imaging processes devices, including, but not limited to, devices pertaining to the imaging processes mentioned directly above.

The customer protocols also may account for the respective image type. For instance, the customer protocols may account for images generated by angiographic, orthopedic, or other imaging processes, including, but not limited to, the imaging processes mentioned directly above. Additionally, the customer protocols may account for the location of the region of interest displayed in the images, such as the cranium, the brain, the abdomen, the heart, the liver, a lung, a breast, the head, a limb, the torso, or any other body area.

Additionally, as noted above, the customer specific data may pertain to a customized user interface of the previous version of the software application. For instance, each medical software application may use customer specific data related to displaying customized windows or text boxes that present messages to be displayed and accept directions from a user, such as what information is to be analyzed. The customer specific data also may pertain to displaying one or more customized floating windows to present analyzed data and generate text messages with recommendations and diagnosis. The customer specific data also may relate to customized software tool tips that may enhance the effectiveness and the efficiency of the users utilizing the software. The tool tips may be accessible from a menu or pop-up window that the user accesses via a mouse, keyboard, touchpad, or other input device. The customer specific data may pertain to additional, fewer, or alternate user specific settings and customizations.

The remote service center may modify a revised version of a software application for a number of customer locations using the same revised version of the software application as a starting point. The modification of the revised version of the software application for each customer location may be different based upon the customer specific data and customer protocols utilized by each customer. Therefore, each modified revised version of the software application may be different. The difference between each modified revised version of the software application may be dependent upon the individual customization required by each customer.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A method for upgrading medical imaging software at a remote service center, the method comprising:
   receiving customer specific data related to a previous version of a medical imaging software application from a customer location at a remote service center, wherein the customer location is a medical facility and the customer specific data comprising individual customer data and customer specific user-interface customizations associated with the previous version of the medical imaging software application;
   receiving customer protocols related to the previous version of the medical imaging software application from the customer location at the remote service center, the customer protocols dependent upon a type of machine at the customer location on which the medical imaging software application operates, a type of imaging process that the medical imaging software application supports, and include settings for medical imaging modules required to generate medical image data;
   modifying a revised version of the medical imaging software application at the remote service center using (1) the customer specific data and (2) the customer protocols received from the customer location at the remote service center;
   transferring the modified revised version of the medical imaging software application to the customer location; and
   executing the modified revised version of the medical imaging software application at the customer location such that the modified revised version of the medical imaging software application is operable at the customer location without further modifications being performed at the customer location that account for customer specific data or customer protocols, and the user-interface employed by the modified revised version of the medical imaging software application at the customer location is substantially identical to the customized user-interface of the previous version of the medical imaging software application.

2. The method of claim 1, wherein the medical imaging software application displays medical images on a screen located at the customer location.

3. The method of claim 1, comprising reissuing software license agreements at the remote service center.

4. The method of claim 1, wherein the modified revised version of the medical imaging software application that is transferred to the customer location is an executable version of the revised version of the medical imaging software application.

5. The method of claim 4, wherein the modified revised version of the medical imaging software application is transferred to the customer location via remote connection.

6. The method of claim 4, wherein the modified revised version of the medical imaging software application is transferred to the customer location via storage medium.

7. A data processing system for upgrading medical imaging software at a remote service center, the system comprising:
   a memory unit located at a remote service center operable to store a revised version of a medical imaging software application; and
   a processing unit located at the remote service center operable to
   (1) receive customer specific data related to a previous version of the medical imaging software application from a customer location and store the customer specific data in the memory unit, wherein the customer location is a medical facility and the customer specific data comprising customer specific user-interface customizations associated with the previous version of the medical imaging software application;
   (2) receive customer protocol data related to the previous version of the medical imaging software application from the customer location and store the customer protocol data in the memory unit, the customer protocol data dependent upon a type of machine at the customer location on which the medical imaging software application operates, a type of imaging process that the medical imaging software application supports, and comprising settings for imaging devices and medical imaging modules associated with the medical imaging software application required to generate medical imaging data;
   (3) modify the revised version of the medical imaging software application using the customer specific data and the customer protocol data;
   (4) create an executable version of the modified revised version of the medical imaging software application; and
   (5) transfer the executable version to the customer location such that the revised version of the medical imaging software application as modified using the customer specific data and the customer protocol data is executable at the customer location on a customer machine without further modification at the customer location, and the user-interface employed by the modified revised version of the medical imaging software application at the customer location is substantially identical to the customized user-interface of the previous version of the medical imaging software application.

8. The system of claim 7, wherein the processing unit is operable to generate an updated software license agreement.

9. The system of claim 7, wherein the processing unit is operable to transfer the executable version of the modified revised version of the medical imaging software application to the customer location via remote connection.

10. The system of claim 7, wherein the processing unit at the remote service center is operable to receive customer specific data and customer protocol data from a plurality of customer locations and produce a modified revised version of the medical imaging software application for each set of customer specific data and customer protocol data received, each modified revised version of the medical imaging software application being unique.

11. The system of claim 7, wherein the processing unit at the remote service center is operable to transmit the executable version of the modified revised version of the medical imaging software application to the customer location via a network.

12. A non-transitory computer-readable medium having instructions executable on a computer stored thereon, the instructions comprising:
receiving customer specific data from a customer location, wherein the customer location is a medical facility, and the customer specific data is related to a customized user interface of a previous version of a medical imaging software application;
receiving customer protocol data from the customer location identifying customer protocols related to the previous version of the medical imaging software application, the customer protocol data identifying a type of machine at the customer location on which the medical imaging software application operates, a type of imaging process that the medical imaging software application supports, and settings required to acquire medical images at the customer location;
modifying a revised version of the medical imaging software application using the customer specific data and to become compatible with the customer protocols received from the customer location; and
transferring the modified revised version of the medical imaging software application to the customer location, wherein, when the modified revised version of the medical imaging software application is run on a machine located at the customer location, the user interface employed by the modified revised version of the medical imaging software application is substantially identical to the customized user interface of the previous version of the medical imaging software application, and the modified revised version of the medical imaging software application is operable without further modifications being performed at the customer location that account for customer specific data or customer protocols.

13. The computer-readable medium of claim 12, wherein the medical imaging software application displays medical images on a screen located at the customer location and the customer protocols further identify the medical imaging modules of the medical imaging software application.

14. The computer-readable medium of claim 13, wherein the type of machine is a magnetic resonance imaging or a computer tomography device.

15. The computer-readable medium of claim 13, wherein the medical images include angiographic or orthopedic images.

* * * * *